(12) United States Patent
Crawford et al.

(10) Patent No.: US 11,051,056 B2
(45) Date of Patent: Jun. 29, 2021

(54) SYSTEMS AND METHODS TO SUPPORT CROSS PLATFORM ADDRESSABLE ADVERTISING

(71) Applicant: AT&T Intellectual Property I, L.P., Atlanta, GA (US)

(72) Inventors: Scott Crawford, Columbus, NJ (US); John Doehler, Kendall Park, NJ (US); Roland Noll, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 676 days.

(21) Appl. No.: 15/830,111

(22) Filed: Dec. 4, 2017

(65) Prior Publication Data

US 2019/0174156 A1    Jun. 6, 2019

(51) Int. Cl.
| | |
|---|---|
| *H04N 21/234* | (2011.01) |
| *G06Q 30/02* | (2012.01) |
| *H04N 21/458* | (2011.01) |
| *H04N 21/2547* | (2011.01) |

(52) U.S. Cl.
CPC ... *H04N 21/23424* (2013.01); *G06Q 30/0271* (2013.01); *G06Q 30/0277* (2013.01); *H04N 21/2547* (2013.01); *H04N 21/458* (2013.01)

(58) Field of Classification Search
None
See application file for complete search history.

(56) References Cited

U.S. PATENT DOCUMENTS

| | | | | |
|---|---|---|---|---|
| 6,026,368 | A * | 2/2000 | Brown | G06Q 30/02 705/14.56 |
| 9,201,979 | B2 | 12/2015 | Ramer | |
| 9,646,323 | B2 | 5/2017 | Foroutan et al. | |
| 9,699,502 | B1 | 7/2017 | Peng et al. | |
| 2009/0089131 | A1 * | 4/2009 | Moukas | G06Q 10/0631 705/70 |

(Continued)

OTHER PUBLICATIONS

NPL_Hojjat_2016: Seyed Ali Hojjat, "New Models and Mechanisms for the Planning and Allocation of Online Advertising", Dissertation, University of California, Irvine, 2016 (Year: 2016).*

*Primary Examiner* — Michael J Sittner
(74) *Attorney, Agent, or Firm* — Guntin & Gust, PLC; Kenneth Kwan

(57) ABSTRACT

Aspects of the subject disclosure may include, for example, a machine-readable storage medium, including executable instructions that perform operations that include providing an interface to a client device to submit an advertising campaign, analyzing a plurality of segments of a plurality of subscribers of an interactive media system according to desired traits for the advertising campaign, determining content distributed by the interactive media system that correlates with the audience as selected media content, identifying a plurality of devices for a selected subscriber of the identified subscribers that receive portions of the selected media content from the interactive media system as an identified plurality of devices, analyzing break metadata for the selected media content, selecting a selected message from an advertising playlist to be assigned to the upcoming break segment, selecting a device for delivery of the selected message. Other embodiments are disclosed.

20 Claims, 11 Drawing Sheets

(56) References Cited

U.S. PATENT DOCUMENTS

| | | |
|---|---|---|
| 2009/0204615 A1 | 8/2009 | Samame et al. |
| 2010/0131352 A1 | 5/2010 | Malhotra et al. |
| 2012/0278164 A1 | 11/2012 | Spivack et al. |
| 2013/0318193 A1 | 11/2013 | Koli et al. |
| 2014/0040008 A1 | 2/2014 | Belani et al. |
| 2014/0229585 A1* | 8/2014 | Wouhaybi ............ G06F 9/4451 709/220 |
| 2014/0351028 A1 | 11/2014 | Killoh |
| 2015/0088635 A1 | 3/2015 | Maycotte et al. |
| 2015/0304698 A1* | 10/2015 | Redol ................ G06Q 30/0251 725/23 |
| 2015/0375117 A1* | 12/2015 | Thompson ........... H04N 21/254 463/9 |
| 2017/0034591 A1 | 2/2017 | McCray et al. |
| 2017/0142465 A1 | 5/2017 | McCray et al. |
| 2017/0249659 A1 | 8/2017 | Shroff |
| 2018/0199089 A1* | 7/2018 | Wilson ............... H04N 21/2668 |

\* cited by examiner

200

300

400

600

1100

SYSTEMS AND METHODS TO SUPPORT CROSS PLATFORM ADDRESSABLE ADVERTISING

FIELD OF THE DISCLOSURE

The subject disclosure relates to systems and methods to support cross platform addressable advertising.

BACKGROUND

Advertisers attempt to tailor their message to potential consumers via advertising campaigns. Advertisers conventionally use a message that can appear across multiple platforms. Advertisers generally try to reach consumers with that message via a particular device that the consumer may use.

BRIEF DESCRIPTION OF THE DRAWINGS

Reference will now be made to the accompanying drawings, which are not necessarily drawn to scale, and wherein.

DETAILED DESCRIPTION

Figure 1:
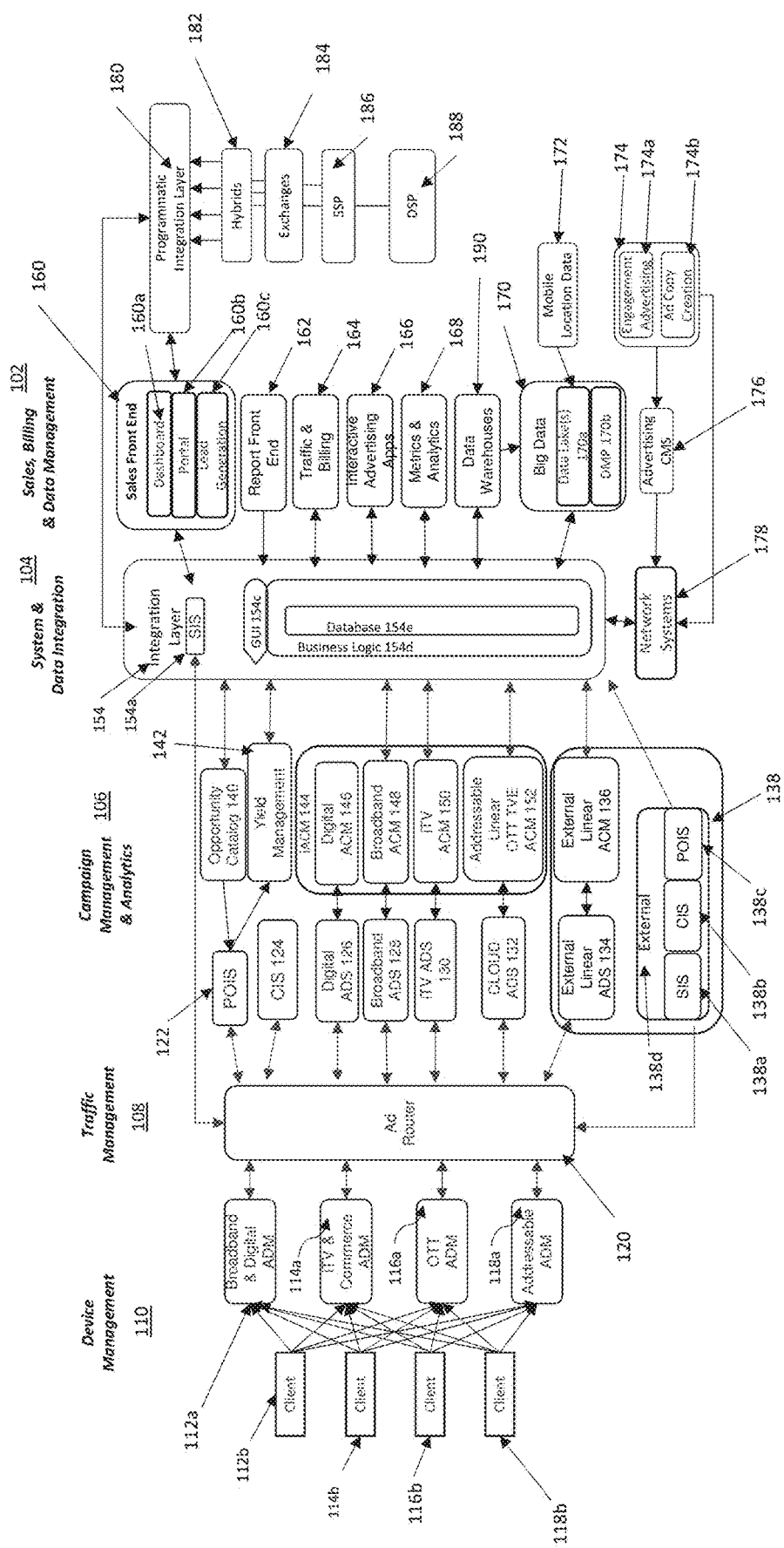
FIG. 1 depicts an illustrative embodiment of a system 100.

The subject disclosure describes, among other things, illustrative embodiments for providing an integrated system for advertising campaigns across an interactive content provider system. Other embodiments are described in the subject disclosure.

One or more aspects of the subject disclosure include a method that includes creating, by a processing system comprising a processor, an advertising campaign according to an advertising objective, wherein the advertising objective includes desired traits for an audience of the advertising campaign, obtaining, by the processing system, a plurality of messages related to the advertising campaign, defining, by the processing system, a plurality of segments of a plurality of subscribers of an interactive media system according to the desired traits for the audience, determining, by the processing system, media content from a plurality of media content distributed by the interactive media system that correlates with the plurality of segments of the audience as selected media content, identifying, by the processing system, a subscriber from among the plurality of subscribers in the interactive media system that correlates with the plurality of segments according to subscriber information for the subscriber from a subscriber database, identifying, by the processing system, a plurality of devices for the subscriber that receive portions of the plurality of media content from the interactive media system as an identified plurality of devices, comparing, by the processing system, the subscriber information of the subscriber with the plurality of messages to generate an advertising playlist of the messages for the subscriber based on the identified plurality of devices, analyzing, by the processing system, break metadata for the selected media content, wherein the break metadata defines time slots available for an insertion of messages within the selected media content, monitoring, by the processing system, for a consumption of the selected media content from among the plurality of media content by the subscriber across the plurality of devices for an upcoming break segment in the selected media content, selecting, by the processing system, a message from the plurality of messages of the advertising playlist to be assigned to the upcoming break segment based on matching the break metadata to each signature of the plurality of messages as a selected message, wherein each signature defines a length of time and a content of each message of the plurality of messages, selecting, by the processing system, a selected device of the plurality of devices of the subscriber for delivery of the selected message during the upcoming break segment, delivering, by the processing system, the selected message to the selected device in proximity to the upcoming break segment to be inserted into the selected media content during the upcoming break, monitoring, by the processing system, a consumption of the selected message by the selected device during the upcoming break segment, and reporting, by the processing system, the consumption of the selected message during the upcoming break segment to a message performance monitoring system for the advertising campaign.

One or more aspects of the subject disclosure include device that includes a processing system including a processor and a memory that stores executable instructions that, when executed by the processing system, facilitate performance of operations which include obtaining a plurality of messages related to an advertising objective of an advertising campaign, wherein the advertising objective includes desired traits for a plurality of segments of a plurality of subscribers of an interactive media system, determining media content from a plurality of media content distributed by the interactive media system that correlates with the plurality of segments as selected media content, identifying a subscriber from among the plurality of subscribers in the interactive media system that correlates with the plurality of segments according to subscriber information for the subscriber from a subscriber database, identifying a plurality of devices for the subscriber that receive portions of the plurality of media content from the interactive media system as an identified plurality of devices, analyzing break metadata for the selected media content, wherein the break metadata defines time slots available for an insertion of messages within the selected media content, monitoring for a consumption of the selected media content from among the plurality of media content by the subscriber across the plurality of devices for an upcoming break segment in the selected media content, selecting a message from the plurality of messages to be assigned to the upcoming break segment based on matching the break metadata to each signature of the plurality of messages as a selected message, wherein each signature defines a length of time and a content of each message of the plurality of messages, selecting a selected device of the plurality of devices of the subscriber for delivery of the selected message during the upcoming break segment, and delivering the selected message to the selected device in proximity to the upcoming break segment to be inserted into the selected media content during the upcoming break.

One or more aspects of the subject disclosure include machine-readable storage medium, including executable instructions that, when executed by a processing system including a processor, facilitate performance of operations, that include providing an interface to a client device to submit an advertising campaign, wherein the advertising campaign includes desired traits for an audience of the advertising campaign and advertising content for the advertising campaign, analyzing a plurality of segments of a plurality of subscribers of an interactive media system according to the desired traits for the audience to determine identified subscribers to target for the advertising campaign, determining content distributed by the interactive media system that correlates with the audience as selected media content, identifying a plurality of devices for a selected subscriber of the identified subscribers that receive portions of the selected media content from the interactive media system as an identified plurality of devices, generating an advertising playlist of the advertising content for the selected subscriber based on the identified plurality of devices by comparing subscriber information of the selected subscriber with the advertising content, analyzing break metadata for the selected media content, wherein the break metadata defines time slots available for an insertion of messages within the selected media content, monitoring for a consumption of the selected media content by the selected subscriber across the plurality of devices for an upcoming break segment in the selected media content, selecting a selected message from the advertising playlist to be assigned to the upcoming break segment based on matching the break metadata to the advertising content as a selected message, selecting a selected device of the plurality of devices of the subscriber for delivery of the selected message during the upcoming break segment, transmitting the selected message to the selected device, and instructing the selected device to insert the selected message into the selected media content during the upcoming break.

FIG. 1 depicts an illustrative embodiment of Ad Tech system 100. Ad Tech System 100 exemplarily includes several components including a Sales, Billing, and Data Management System 102, a System and Data Integration Component 104, a Campaign Management & Analytics System 106, a Traffic Management System 108, and a Device Management System 110.

In one example, the Ad Tech system 100 employed by a content provider can be approached by a client who wishes to advertise for sports cars. The advertiser selects various traits for the advertising campaign, such as males earning over a certain amount of income. Exemplarily, the advertising campaign has an advertising objective to present an advertising message for these particular subscribers for that product across a variety of devices that subscriber may employ. In exemplary embodiments, these subscribers are identified, an inventory of advertising messages is accessed, and the various user equipment of these selected subscribers is monitored. When the identified subscriber is consuming media content, or other content, from the service provider or other third party providers, an appropriate break for advertising content can be predicted to occur. An ad decision manager can choose an ad message to be presented to the subscriber on whatever particular device the subscriber is engaged with during that break for advertising content. In some embodiments, one particular communication device or computing device of the group of subscriber devices is preferred by the advertising objective. In other embodiments, advertising during one of the particular activity or media consumption may be preferred by the advertising objectives.

Exemplarily, the Sales, Billing, and Data Management System 102 can include a Sales Front End Portion 160 in which the advertising campaign can be defined. The Sales Front End Portion 160 can include a dashboard 160a, a portal 160b, and a lead generation section 160c. The Sales Front End Portion 160 exemplarily supports entry of data for use in defining audience segments, definitions for the ad campaign, and an allocation of an inventory of advertising content, as well as other information or content as required.

Exemplarily, a service provider can exercise internal control over the advertising campaign within the Ad Tech System 100 while also providing external access to various clients and content providers. The external access could include the creation or submission of advertising content, feedback for the effectiveness of the advertisements, as well as billing and other accounting needs. The dashboard 160a can exemplarily provide an interface for the ability to internally manage the ad campaign from conception of the advertising campaign to the delivery of advertising content to the targets of the advertising campaign. Exemplarily, the dashboard 160a can provide internal management options for advertising campaigns, including automated management and completion, initial forecasting and planning—including inventory opportunities, and mid-campaign performance and yield optimization.

The Sales Front End Portion 160 can exemplarily interact with a Programmatic Integration Layer 180. The Programmatic Integration Layer 180 can exemplarily provide an interface with external supply side platforms (SSP) 186 which provides a conduit to allow external entities to interact with the Ad Tech System 100. A demand side platforms (DSP) 188 can provide access to external inventory. Hybrids 182 and Exchanges 184 can further provide access to the system.

Exemplary embodiments of the opportunity catalog 140 and yield management system 142 can support a programmatic advertising model, whereby the Ad Tech system 100 can provide support to external systems such as the SSP 186 and DSP 188. In some embodiments, the DSP 188 is enabled via middleware such as the PIL 180. Embodiments of the PIL 180 can support two models including an SSP 186 interaction which allows external entities to purchase internally owned and operated inventory for addressable ad insertion into one of their advertising campaigns (thus allowing Ad Tech system 100 the ability to sell-off unsold inventory) and a DSP 188 interaction, which allows the Ad Tech system 100 to purchase external owned & operated inventory for internally sold addressable ad campaigns, thus providing additional opportunities for the selected audience to view addressable ads.

The Sales, Billing, and Data Management System 102 can interact with the System and Data Integration Component 104. In particular, the Sales Front End Portion 160 can interact with the integration layer 154. Various components of the Sales, Billing, and Data Management System 102 can exemplarily provide information to the integration layer 154. The report front end 162, traffic and billing 164, interactive advertising application 166, metrics and analytics 168 can provide and receive feedback to the integration layer 154. Traffic and billing system 164 can support creation of campaign invoicing to advertisers/clients. The traffic and billing system 164 manages schedules for live linear ad campaigns. The interactive advertising application 166 can provide a platform to support the creation of interactive advertising applications and can associate this with linear ad content. The metrics and analytics 168 can ingest and store metrics, including ad insertion and ad usage. The metrics and analytics 168 can also normalize and summarize the acquired metrics, then delivers the metrics to numerous back-end systems.

Exemplarily, data warehouses 190 can provide analytics from a big data section 170 to the integration layer 154. Exemplarily, the data warehouses 190 can be enterprise level repositories at which subscriber data for an interactive content system, a network, or a service provide can be stored. Big data 170 can include data lakes 170a and data management platforms 170b. The big data 170 section can exemplarily receive mobile location data 172 for subscriber device of the interactive content system, network, or service provider.

Exemplarily, advertising content, such as advertising and messages, can be obtained or generated through the engagement advertising platform 174. The engagement advertising platform 174 can provide advertising clients with a mechanism to define and generate ad-copy, which can be associated with cross-platform addressable ad campaigns. The engagement advertising platform 174 can include an ad copy creation interface 174b and an engagement advertising platform 174a.

Exemplarily, the engagement advertising platform 174 includes ad copy creation functionality, supported by an advertising-specific content management system (CMS) 178. The engagement advertising platform 174 can provide advertising clients with a mechanism to define and generate ad-copy, which will be associated with cross-platform addressable ad campaigns.

The integration layer 154 can include a subscriber information service (SIS) 154a that can provide a real-time functionality to provide a cached version of information, linking an ID, such as an identification of a household, a device, a profile, an individual person, to segments. Segments can exemplarily be described as a collection of traits targeted by the advertising campaign. The SIS 154a can exemplarily support real-time queries from Ad Router 120 of the Traffic Management System 108. The information provided by the SIS 154a can be managed via a graphical user interface (GUI) 154c. In additional embodiments, the GUI 154c can provide access to business logic system 154d and database 154e for the integration layer 154.

Exemplarily, the System and Data Integration Component 104 can communicate with the Campaign Management & Analytics System 106. The Campaign Management & Analytics System 106 can include an interactive ad campaign management system (iACM) 144. The yield management system 142 can support opportunity/inventory management. Exemplarily, the iACM 144 can maintain and manage a cross platform addressable advertising campaign integrity by controlling a campaign definition, an association with audience segments, an available inventory of advertising content, and performance monitoring. In addition, the opportunity catalog 140 includes an inventory of available advertising content that can be accessed by the iACM 144.

The placement opportunity information system (POIS) 122 can interact with the opportunity catalog 140 and yield management system 142 to ingest break information metadata from the content information system 124. The POIS 122 exemplarily provides data to yield management system 142 and supports real-time queries from the Ad Router 120 about information regarding dynamic ad routing to a specific ad decision service. A content information system 124 can ingest entertainment and advertising metadata (both of which are associated with entertainment & advertising assets), selects the break information (break start/stop, duration, type and ownership) and delivers this information to the POIS 122.

As the campaign executes from a start-date to an end-date, the yield management system 142 can performs a continuous monitoring/managing of the ad campaign, where adjustments are made to improve maximize yield and campaign profitability. In some embodiments, upon a campaign's completion, the campaign metrics can be delivered to the Big Data platform 170, the traffic and billing 164, the report front end 162, and metrics and analytics 168, where each system can exemplarily use this information for an appropriate task. In some embodiments, household/subscriber data, which is hosted in the data warehouse 190, the big data platform 170, the various ADM's, and the SIS 154a, all of which control, analyze and disperse this data to the necessary systems (vertical ad insertion systems, wholesalers, programmers, etc.), all while ensuring necessary security, privacy considerations, and when necessary, obfuscation.

As exemplarily illustrated in FIG. 1, various ad campaign management systems can be provided as part of the iACM 144. These exemplary ad campaign management systems can include a digital ACM 146, broadband ACM 148, an iTV ACM 150, and a linear addressable OTT TVE ACM 152. Exemplary embodiments of the ACM can provide ad campaign management for a specific vertical silo or assigned inventory pools. The ACM's exemplarily communicate with the ADS 120 for support in campaign ad decisions.

Exemplarily, an ad decision service (ADS) can be paired with a respective one of the ad campaign management (ACM) systems. As illustrated in FIG. 1, these can include a digital ADS 126, a broadband ADS 128, an iTV ADS 130, and a cloud ADS 132. Exemplary embodiments of the ad decision services can support the ad decision process, based upon campaign data from iACM 144 as well as contextual data and subscriber information received in the ad decision request. Exemplarily, an ad decision response is generated and delivered back to the Ad Router 120 and the ad decision managers to allow a client to act upon the ad decision.

In some embodiments, the ad decision services and the ad campaign management system can be provided externally from the system. As illustrated in FIG. 1, an external environment 138 can include an external linear ADS 134 in association with an external linear ACM 136 in association with an exemplary external SIS 138a, CIS 138b, and POIS 138c similar to the internal SIS 154a, POIS 122, and CIS 124 described above. Exemplarily, the external SIS 138a, CIS 138b, and POIS 138c can likewise communicate with the integration layer 154 and Ad Router 120.

Exemplarily, the Ad Router 120 can manage the routing of ad decisions to the correct ADS based upon business parameters and instructions received from the POIS 122. The Ad Router 120 can also communicate insertion metrics back to the Campaign Management & Analytics System 106.

Exemplarily, the Ad Router 120 interfaces with the SIS 154a to obtain knowledge (i.e. traits & segments) about the subscriber ID for which the ad decision is being requested. The ad decision itself is exemplarily made in real-time based upon data received from a variety of sources (entertainment and ad assets—and their availability based upon network information), campaign information, on-going metrics, household traits, contextual information (current/mobile location, entertainment being viewed, date/time, etc.). These exemplary sources are illustrated throughout FIG. 1 in various embodiments, such as mobile location data 172, metrics and analytics 168, data warehouse 190, SIS 154a, and external SIS 138a.

In some embodiments, the Ad Router 120 may utilize a subscriber's current location and compare it against campaign-based "points of interest (POI)". This can be used to drive proactive ad insertion. Proactive ad insertion can exemplary include an ad directed to a device by comparing a current location to a POI. The POI can also help with post-campaign analytics by providing attribution in which actions are tracked after an ad-insertion. Once the ad has been inserted, the metrics can be returned to the Ad Router 120 and onto a respective ADS.

Next, the Device Management System 110 can interact with various client devices which can receive the ad content from the Ad Router 120. In exemplary embodiments of the ad decision managers (ADM), an ad decision request can be generated and delivered to the Ad Router 120. The ADM can exemplarily receive an ad decision response from the Ad Router 120 and formulate an ad playlist. In some embodiments, the ad playlist is provided to a respective client device. Various client devices and client applications can be addressed and used by subscribers to view the directed entertainment and advertising content. The client devices can exemplarily interface with an ADM or directly with the Ad Router 120 to support the insertion of addressable ad assets.

As illustrated in FIG. 1, the client devices and ADM's can exemplarily include a broadband/digital ADM 112a, an iTV and commerce ADM 114a, and OTT ADM 116a, and an addressable ADM 118a. These ADM's 112a, 114a, 116a, and 118a can interact with various client devices as represented by clients 112b, 114b, 116b, and 118b. Exemplarily, client 112b can represent broadband and digital services provided to a subscriber, such as Internet browsing performed at a home computing device or through an application on a mobile media processor. Exemplarily, client 114b can represent iTV services provided to the subscriber. Exemplarily, client 116b can represent over-the-top (OTT) services being provided to the subscriber, such as viewing OTT media content at a home media process or at a mobile media processor. Exemplarily, the client 118b can represent addressable linear television services or linear OTT services provided to a media processor.

Figure 2:
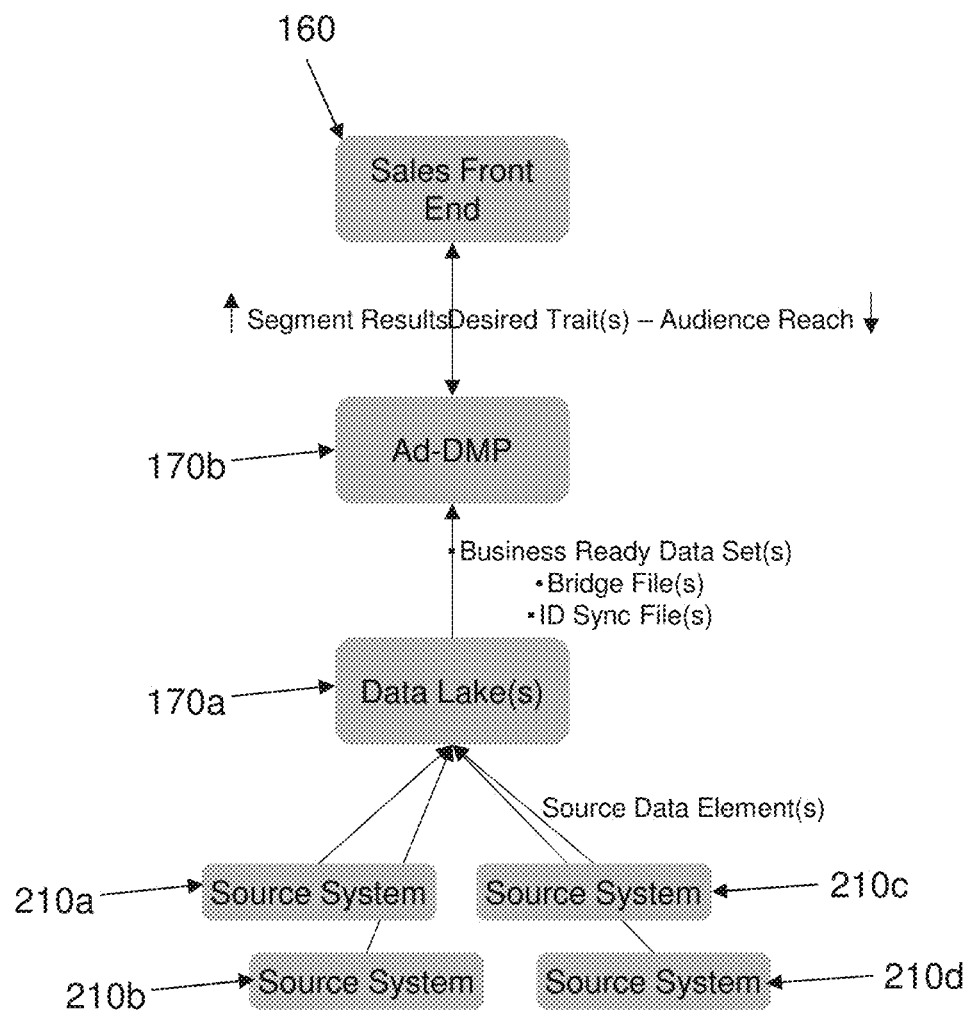
FIG. 2 depicts an illustrative embodiment of system 200.

FIG. 2 depicts an illustrative embodiment of system 200. Exemplarily, system 200 describes a portion of the elements of Ad Tech 100 of FIG. 1 that can perform the defining and collection of traits for an ad campaign that can build a segment for reaching an audience. Exemplarily, the sales front end 160 of FIG. 1 can access the data lakes 170a and data management platforms 170b of big data 170. The data lakes 170a and data management platforms 170b can find information from a variety of sources 210a, 210b, 210c, and 210d such as entertainment and ad assets, and their availability based upon network information, campaign information, on-going metrics, household traits, and contextual information (i.e., current location, entertainment being viewed, date/time, etc.).

Exemplarily, the sales front end 160 can receive input on the attributes of the ad campaign. The attributes of the ad campaign can be according to an advertising objective that includes desired traits for an audience, or segments, of the advertising campaign, the messages intended for the audience of the advertising campaign, and the devices to which the various messages should be delivered.

Figure 3:
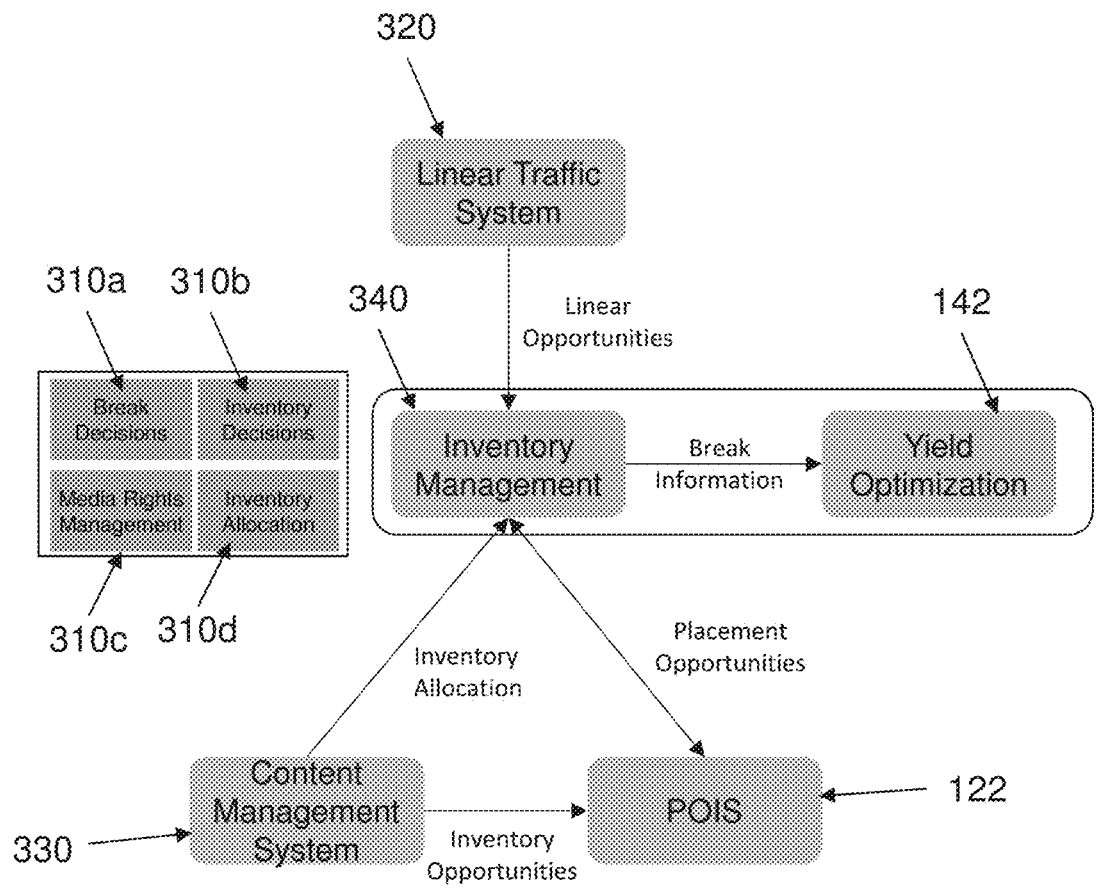
FIG. 3 depicts an illustrative embodiment of system 300.

FIG. 3 depicts an illustrative embodiment of system 300 that further illustrates portions of the Ad Tech system 100 of FIG. 1. Exemplarily, an upcoming break in linear media content, such as live TV delivered by linear traffic system 320, can be predicted. Based on the predicted break in the linear media content, the inventory management system 340 can be accessed to identify pools of advertising content to be inserted during the upcoming break based on the audience at the device providing the linear media content.

Exemplarily, the inventory management system 340 and the yield optimization system 142 can dissect the campaign across the various ad campaign platforms/ad insertion platforms, utilizing audience reach and available inventory. Break decisions 310a, inventory decisions 310b, media rights management 310c, and inventory allocation 310d are taken into account by the inventory management system 340, the content management system 330, and the POIS 122.

Figure 4:
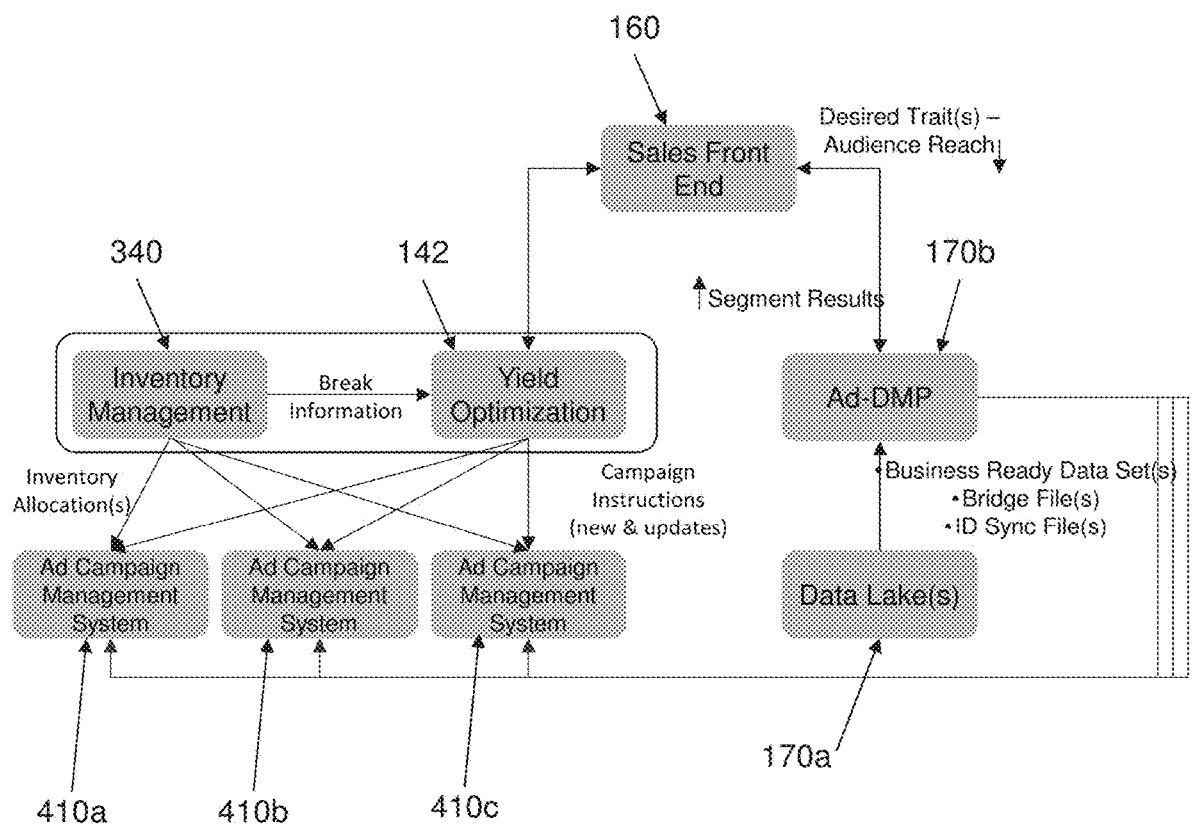
FIG. 4 depicts an illustrative embodiment of system 400.

FIG. 4 illustrates an exemplary system 400 that illustrates portions of Ad Tech system 100 of FIG. 1 directed to cross platform management of the advertising campaign. In FIG. 4, the sales front end 160 can provide desired traits and desired audience reach data to the data lakes 170a and data management platforms 170b of big data 170. Exemplarily, the data lakes 170a can inform the data management platforms 170b of relative business ready data sets. Exemplarily, the data lakes 170a and data management platforms 170b of big data 170 can return segment results of the subscriber base of the interactive content system that employs the Ad Tech system 100 of FIG. 1 to the sales front end 160 which in turn can communicate with the inventory management system 340 and the yield optimization system 142. Exemplarily, the inventory management system 340 and the yield optimization system 142 can communicate with exemplary ad campaign management sections 410a, 410b, and 410c to target subscribers by the desired segments to provide available advertising inventory to the appropriate devices of targeted subscribers.

Figure 5:
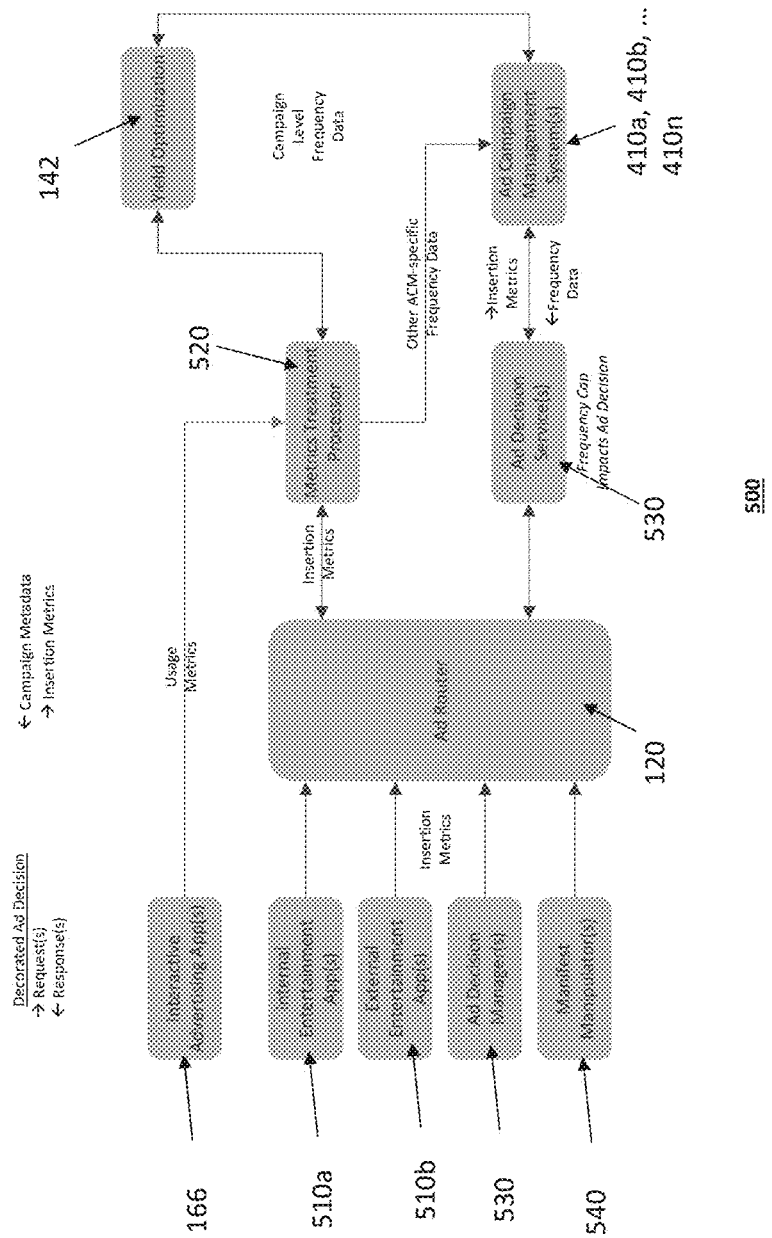
FIG. 5 depicts an illustrative embodiment of system 500.

FIG. 5 illustrates an exemplary system 500 which illustrates portions of Ad Tech system 100 of FIG. 1 directed to defining campaign frequency caps. Exemplary embodiments of system 500 can monitor the insertion of advertising messages into the media content. Exemplarily, the amount of advertising provided according to the advertising campaign can be capped based upon a client constraint. When the client constraints on the advertising are met, the Ad Tech system 100 of FIG. 1 can cease providing the advertising to the various subscriber devices.

Exemplarily, the yield optimizer 142 can interact with a metrics treatment processor 520. Exemplarily, the metrics treatment processor 520 can receive usage metrics from interactive advertising applications 166 and the Ad Router 120. The Ad Router 120 can receive insertion metrics from internally owned or operated entertainment application 510a, externally owned or operated entertainment applications 510b, various embodiments of ad decision managers 530, and manifest manipulators 540.

Exemplarily, the Ad Router 120 can provide data to the ad decision services 530 which can exemplarily include the digital ADS 126, the broadband ADS 128, the iTV ADS 130, and the cloud ADS 132 of FIG. 1. The ad decision services 530 can use the frequency data and insertion metrics to modify ad decisions that are made with respect to the various segments and advertising messages. Exemplarily, the ad decision services 530 receives ad frequency data from the various ad campaign management systems 410*a*, 410*b*, . . . 410*n* while providing insertion metrics thereto. In addition, the metrics treatment processor 520 can provide other frequency data that may be ad campaign management system specific to the various ad campaign management systems 410*a*, 410*b*, . . . 410*n*.

Figure 6:
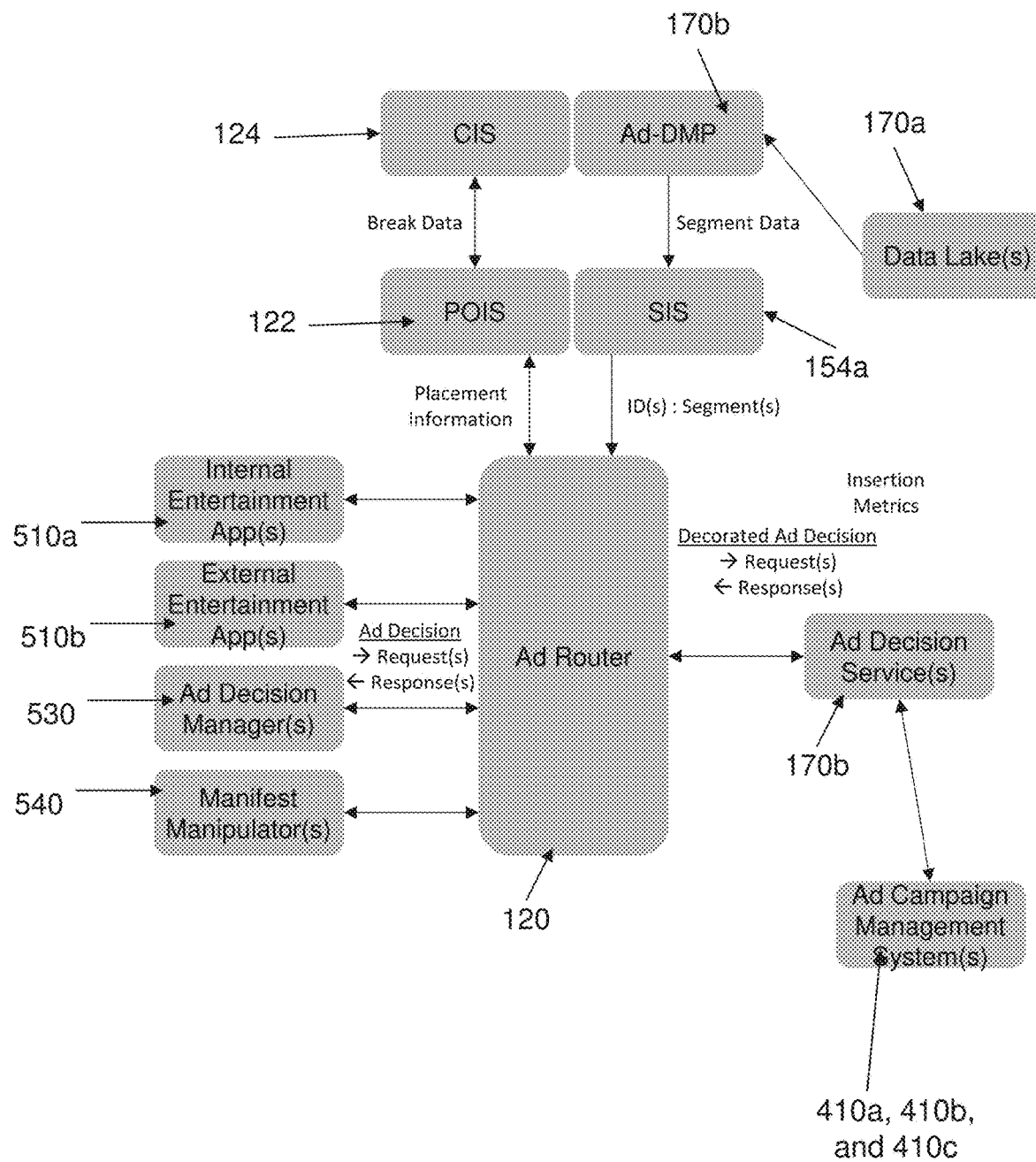
FIG. 6 depicts an illustrative embodiment of system 600.

FIG. 6 illustrates an exemplary system 600 that illustrates portions of Ad Tech system 100 of FIG. 1 directed to illustrating advertisement routing decisions. Exemplarily, system 600 defines a process of advertising message insertion decisions to a variety of client applications and devices based upon breaks in media content and various advertising spots available in other applications. Exemplarily, the Ad Router 120 can receive ad decision requests and responses from internally owned or operated entertainment application 510*a*, externally owned or operated entertainment applications 510*b*, various embodiments of ad decision managers 530, and manifest manipulators 540. The ad campaign management systems 410*a*, 410*b*, and 410*c* and the ad decision services 530 can communicate with the Ad Router 120 to share data regarding the ad decision requests and responses.

Exemplarily, the SIS 154*a* can receive segment data from the data lakes 170*a* and data management platforms 170*b* of big data 170. The SIS 154*a* can provide the identification of these segments to the Ad Router 120. In addition, the CIS 124 can provide break data to the POIS 122. The POIS 122 can provide placement information to the Ad Router 120.

Figure 11:
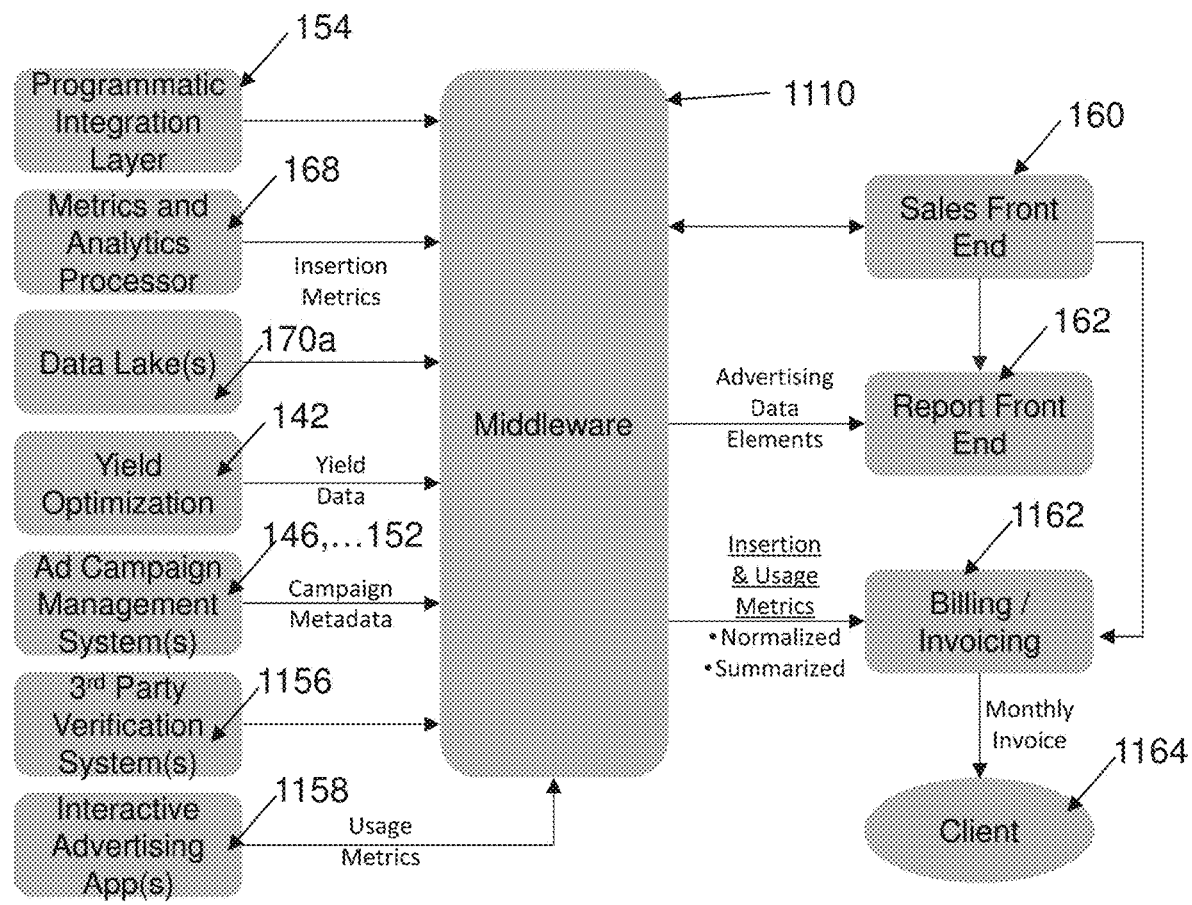
FIG. 11 depicts an illustrative embodiment of system 1100.

FIG. 11 illustrates an exemplary system 1100 that illustrates portions of Ad Tech system 100 of FIG. 1 directed to delivering campaign performance data and insertion metrics to the billings system. Exemplarily, middleware 1110 can provide interactivity between the sales front end 160 and the report front end 162. Exemplarily, the sales front end can provide information to the billing and invoice section 1162 to provide periodic invoices to the client 1164. In addition, the middleware 1110 can provide insertion and usage metrics to the billing and invoice section 1162. In some embodiments, the billing and invoice section 1162 can be similar to the traffic and billing 164 of FIG. 1. Exemplarily, the middleware 1110 can provide advertising data elements to the report front end 162.

In some embodiments, the middleware 1110 can receive additional information from various elements including the programmatic integration layer 154, the metrics and analytics section 168, the data lakes 170*a*, the yield management section 142, the various ACM's 146, 148, 150, and 152, a $3^{rd}$ party verification system 1156, and interactive advertising applications 1158. Exemplarily, the metrics and analytics section 168 can provide insertion metrics to the middleware 1110. In some embodiments, the yield management section 142 can provide yield data to the middleware 1110. Each of the various ACM's 146, 148, 150, and 152 can provide campaign metadata to the middleware 1110. The interactive advertising applications 11158 can provide usage metrics to the middleware 1110.

Figure 12:
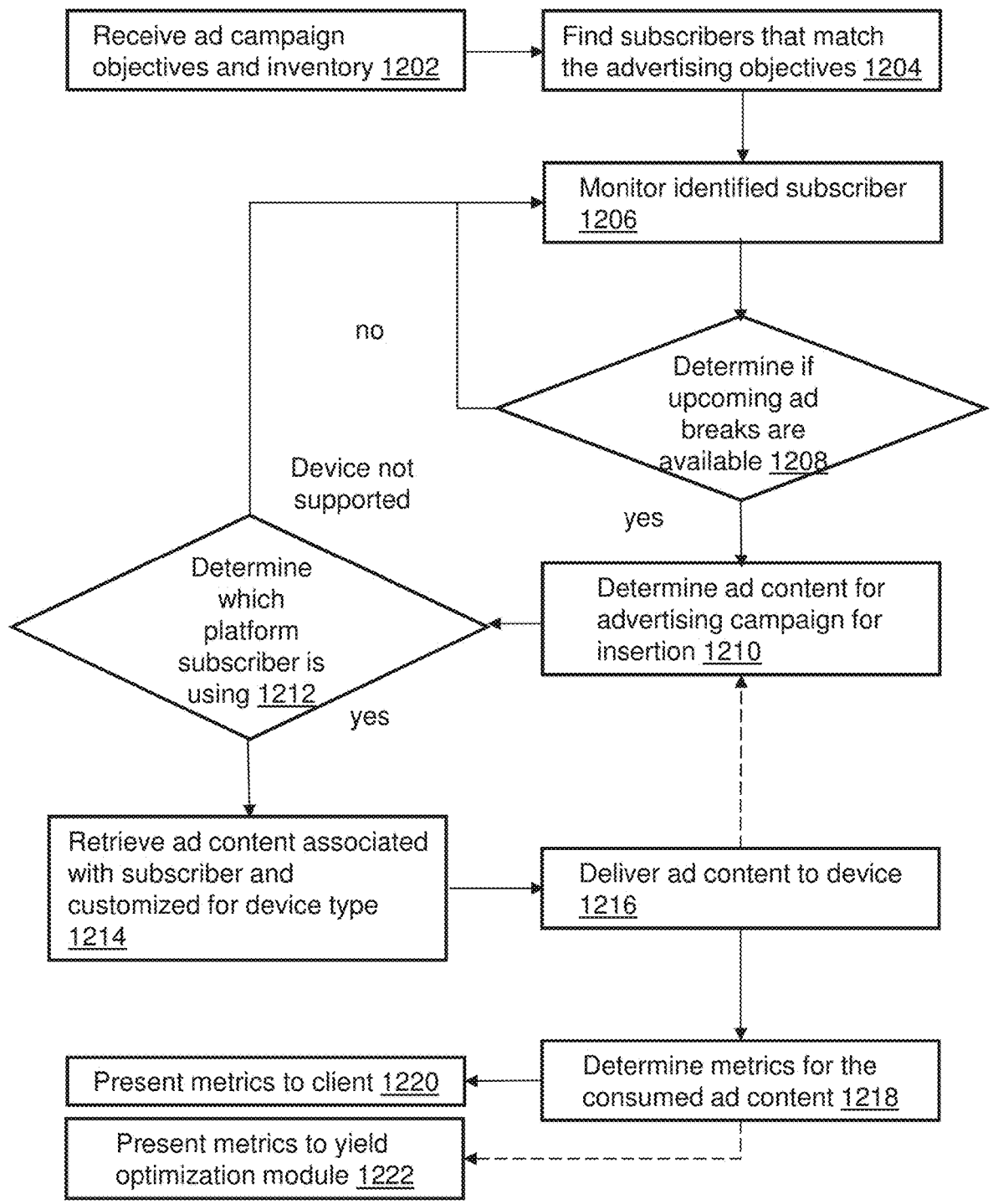
FIG. 12 depicts an illustrative embodiment of a method used in portions of the system described in FIGS. 1-6 and 11.

FIG. 12 depicts an illustrative embodiment of a method 1200 used by Ad Tech system 100 of FIG. 1. Exemplarily, method 1200 can begin at step 1202 in which the advertising campaign is defined. In some embodiments, the creation of the ad campaign can include receiving inventory, such as various advertising materials. In addition, the creation of the ad campaign can include receiving a definition of the market segment or subscription segment to be reached. In some embodiments, the advertiser can be provided with an interactive portal or interface with which the advertiser can manage the campaign. In step 1204, the various subscribers that match the segments defined by the advertising objectives can be determined. Exemplarily, the various databases of a content provider can be searched to find appropriate subscribers.

Exemplarily, in step 1206, the identified subscribers that match the campaign objectives can be monitored. Exemplarily, the monitoring of the subscribers can include determining a location of the subscriber, a device the subscriber is currently accessing, and the content that the subscriber is consuming During the monitoring, the content can be monitored for upcoming breaks in step 1208. In some embodiments, a decision can be made to interject an advertising break into content that would otherwise have no breaks, such as if the subscriber were using an application or viewing OTT content. If no break in the content is occurring or if there is a decision not to interject a break into the content, then the method 1200 can return to the monitoring step 1206. Otherwise, the method 1200 can proceed to step 1210 to exemplarily determine which ad content from among the inventory of advertisements for the ad campaign should be inserted into the consumed content.

In step 1212, an identity or address of a subscriber device can be determined. For example, in some instances, the subscriber could be watching live streaming TV on a set-top box or an over-the-top delivery of media content on a mobile media processor. In other embodiments, the subscriber could engaging social media through an application being performed on another device type. If the device is supported by the inventory of advertising content, the method can proceed to step 1214 in which an appropriate ad is selected for the subscriber and the device type. In step 1216, the advertising content can be inserted into the content being consumed by the subscriber.

In step 1218, the consumption of the advertising content can be analyzed and metrics can be determined for the efficacy of the content. In some embodiments, it can be determined if the subscriber used the advertising content to seek additional input or information. Exemplarily, the subscriber could be prompted to access a website and if that website is visited by the subscriber, the advertising content could be considered a success. In addition, the behavior of the subscriber can be measured to determine if the advertising content was ignored (i.e., the device sound was turned down during the presentation). Exemplarily, the metrics can be fed back to the system to further refine the determination of advertising content in step 1210.

In step 1220, the metrics can be further refined and delivered to the client. In some instances, this presentation can be in the form of a billing statement. In other embodiments, the client can be presented with feedback on the performance of the advertising content with the subscriber, in particular, as well as the performance across all targeted subscribers for the selected subscriber segments. In additional embodiments, the metrics can be fed to the yield optimization system 142 in step 1222 to allow for refinement of the advertising campaign. In some embodiments, advertising content with better results can be promoted over advertising content with fewer results.

While for purposes of simplicity of explanation, the respective processes are shown and described as a series of blocks in FIG. 12, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
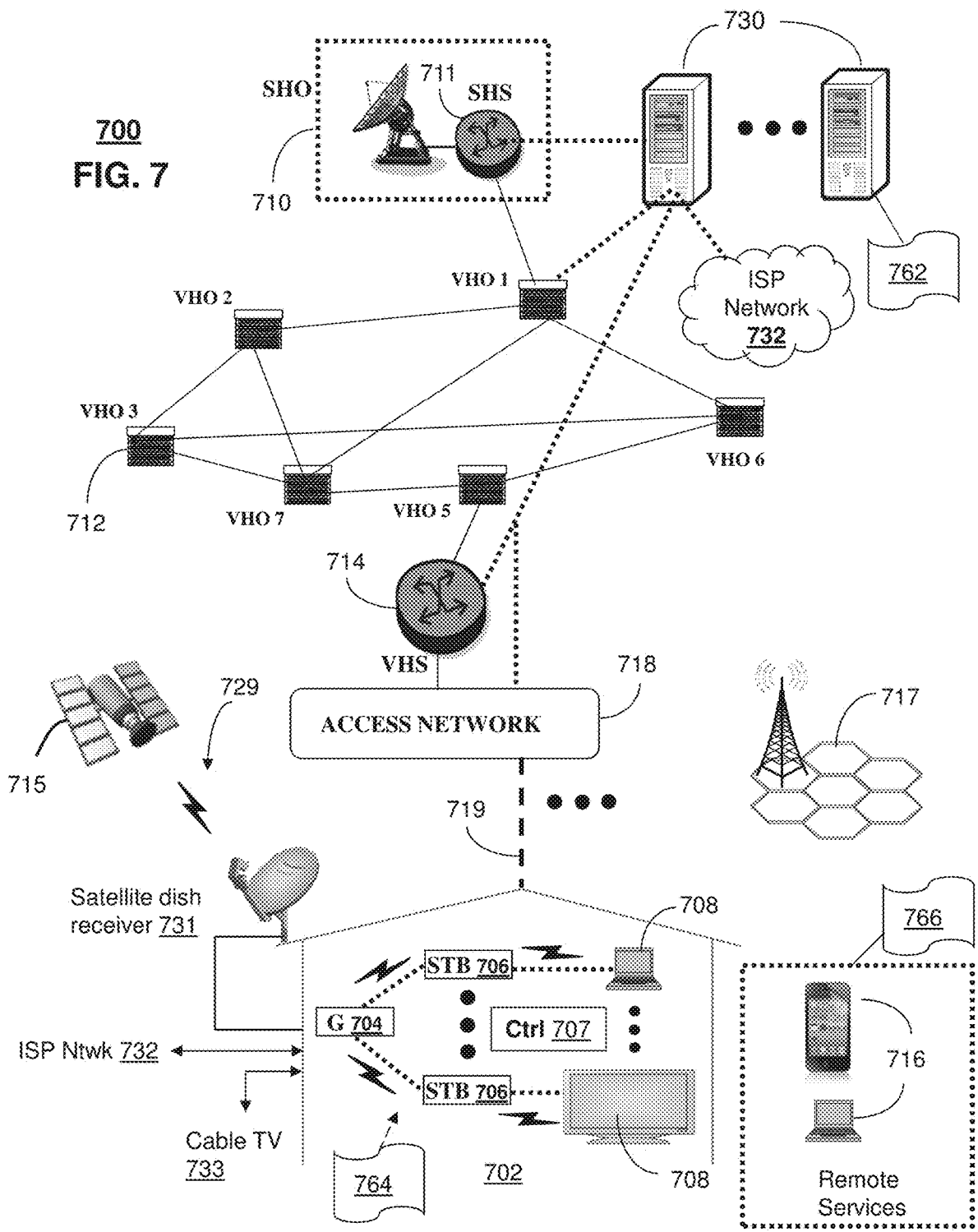
FIG. 7 depicts an illustrative embodiment of a communication systems that provide media services to the various systems of FIGS. 1-6.

FIG. 7 depicts an illustrative embodiment of a communication system 700 for providing various communication services, such as delivering media content. The communication system 700 can represent an interactive media network, such as an interactive television system (e.g., an Internet Protocol Television (IPTV) media system). Communication system 700 can be overlaid or operably coupled with Ad Tech 100 of FIG. 1 as another representative embodiment of communication system 700. For instance, one or more devices illustrated in the communication system 700 of FIG. 7 can perform steps that include creating an advertising campaign according to an advertising objective, wherein the advertising objective includes desired traits for an audience of the advertising campaign, obtaining a plurality of messages related to the advertising campaign, defining a plurality of segments of a plurality of subscribers of an interactive media system according to the desired traits for the audience, determining media content from a plurality of media content distributed by the interactive media system that correlates with the plurality of segments of the audience as selected media content, identifying a subscriber from among the plurality of subscribers in the interactive media system that correlates with the plurality of segments according to subscriber information for the subscriber from a subscriber database, identifying a plurality of devices for the subscriber that receive portions of the plurality of media content from the interactive media system as an identified plurality of devices, comparing the subscriber information of the subscriber with the plurality of messages to generate an advertising playlist of the messages for the subscriber based on the identified plurality of devices, analyzing break metadata for the selected media content, wherein the break metadata defines time slots available for an insertion of messages within the selected media content, monitoring for a consumption of the selected media content from among the plurality of media content by the subscriber across the plurality of devices for an upcoming break segment in the selected media content, selecting a message from the plurality of messages of the advertising playlist to be assigned to the upcoming break segment based on matching the break metadata to each signature of the plurality of messages as a selected message, wherein each signature defines a length of time and a content of each message of the plurality of messages, selecting a selected device of the plurality of devices of the subscriber for delivery of the selected message during the upcoming break segment, delivering the selected message to the selected device in proximity to the upcoming break segment to be inserted into the selected media content during the upcoming break, monitoring a consumption of the selected message by the selected device during the upcoming break segment, and reporting the consumption of the selected message during the upcoming break segment to a message performance monitoring system for the advertising campaign.

In one or more embodiments, the communication system 700 can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol. The VHS 714 can distribute multimedia broadcast content via an access network 718 to commercial and/or residential buildings 702 housing a gateway 704 (such as a residential or commercial gateway).

The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as an advertising system (herein referred to as ad system 730). The ad system 730 can use computing and communication technology to perform function 762, which can include among other things, the various steps of method 1200 of FIG. 12 as well as each of the various systems described and illustrated in Ad Tech 100 of FIG. 1. For instance, function 762 of server 730 can be similar to the functions described for the Sales, Billing, and Data Management System 102, the System and Data Integration Component 104, the Campaign Management & Analytics System 106, the Traffic Management System 108, and the Device Management System 110 of FIG. 1 as well as method 1200 of FIG. 12. The media processors 706 and wireless communication devices 716 can be provisioned with software functions 764 and 766, respectively, to utilize the services of ad system 730. For instance, functions 764 and 766 of media processors 706 and wireless communication devices 716 can be similar to the functions described for the client devices 112b, 114b, 116b, and 118b of FIG. 1.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
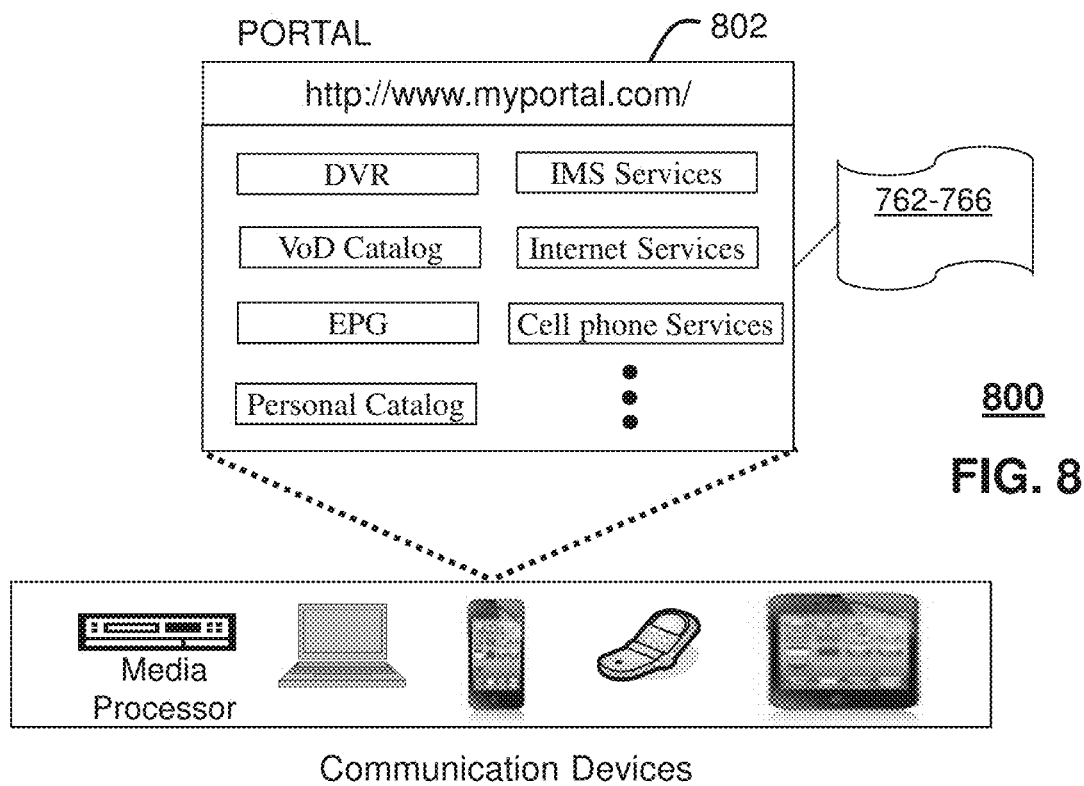
FIG. 8 depicts an illustrative embodiment of a web portal for interacting with the communication systems of systems 100, 200, 300, 400, 500, 600, 700 and 1100 of FIGS. 1-7 and 11.

FIG. 8 depicts an illustrative embodiment of a web portal 802 of a communication system 800. Communication system 800 can be overlaid or operably coupled with Ad Tech 100 of FIG. 1, and/or communication system 700 of FIG. 7 as another representative embodiment of Ad Tech 100 of FIG. 1 and/or communication system 700. The web portal 802 can be used for managing services of Ad Tech 100 of FIG. 1, such as GUI 154c, sales front end 160, the programmatic integration layer 180, and communication system 700. A web page of the web portal 802 can be accessed by a Uniform Resource Locator (URL) with an Internet browser using an Internet-capable communication device such as those described in FIGS. 1 and 7, as well as the various devices illustrated in FIGS. 2-6 and 11. The web portal 802 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 802 can also be used for provisioning IMS services described earlier, provisioning Internet services, provisioning cellular phone services, and so on.

The web portal 802 can further be utilized to manage and provision software applications 762, 764, and 766 to adapt these applications as may be desired by subscribers and/or service providers of Ad Tech 100 of FIG. 1 and communication systems 700 of FIG. 7. For instance, the advertising various clients of the content provider can log into their on-line accounts and provision the engagement advertising platform 174 or server 730 with the various advertising objectives and messages to create an advertising campaign and to update the advertising campaign as feedback is received from the delivery of the messages to the various subscribers, and so on. In addition, the web portal can be utilized by the various subscribers as they consume content from the content provider and respond to the messages as provided to them. Service providers can log onto an administrator account to provision, monitor and/or maintain the Sales, Billing, and Data Management System 102, the System and Data Integration Component 104, the Campaign Management & Analytics System 106, the Traffic Management System 108, and the Device Management System 110 of FIG. 1 or server 730 of FIG. 7.

Figure 9:
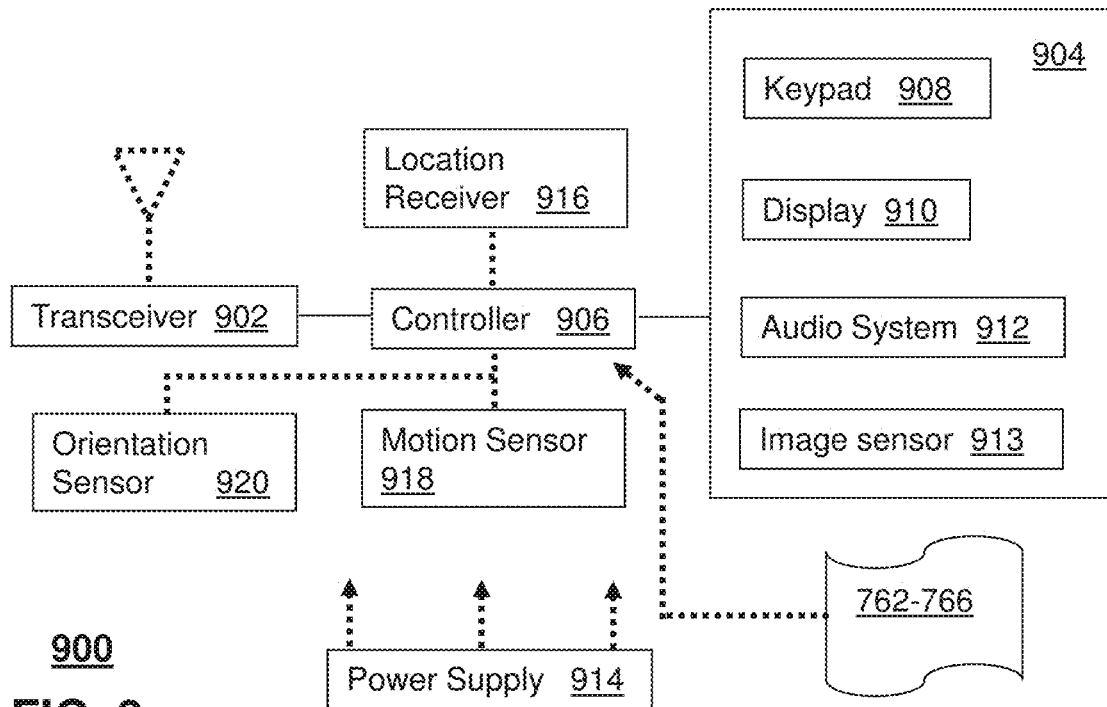
FIG. 9 depicts an illustrative embodiment of a communication device.

FIG. 9 depicts an illustrative embodiment of a communication device 900. Communication device 900 can serve in whole or in part as an illustrative embodiment of the devices depicted in the Sales, Billing, and Data Management System 102, the System and Data Integration Component 104, the Campaign Management & Analytics System 106, the Traffic Management System 108, and the Device Management System 110 of FIG. 1 and FIG. 7 and can be configured to perform portions of the method 1200 of FIG. 12.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of clients 112b, 114b, 116b, and 118b of FIG. 1, the media processor 706, the media devices 708, or the portable communication devices 716 of FIG. 7. It will be appreciated that the communication device 900 can also represent other devices that can operate in Ad Tech 100 of FIG. 1, the various illustrations of FIGS. 2-6 and 11, and communication systems 700-800 of FIGS. 7-8 such as a gaming console and a media player. In addition, the controller 906 can be adapted in various embodiments to perform the functions 762, 764, and 766, respectively.

Upon reviewing the aforementioned embodiments, it would be evident to an artisan with ordinary skill in the art that said embodiments can be modified, reduced, or enhanced without departing from the scope of the claims described below For example, presence data and image data can be used to gauge the reaction of subscribers to the advertising messages. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
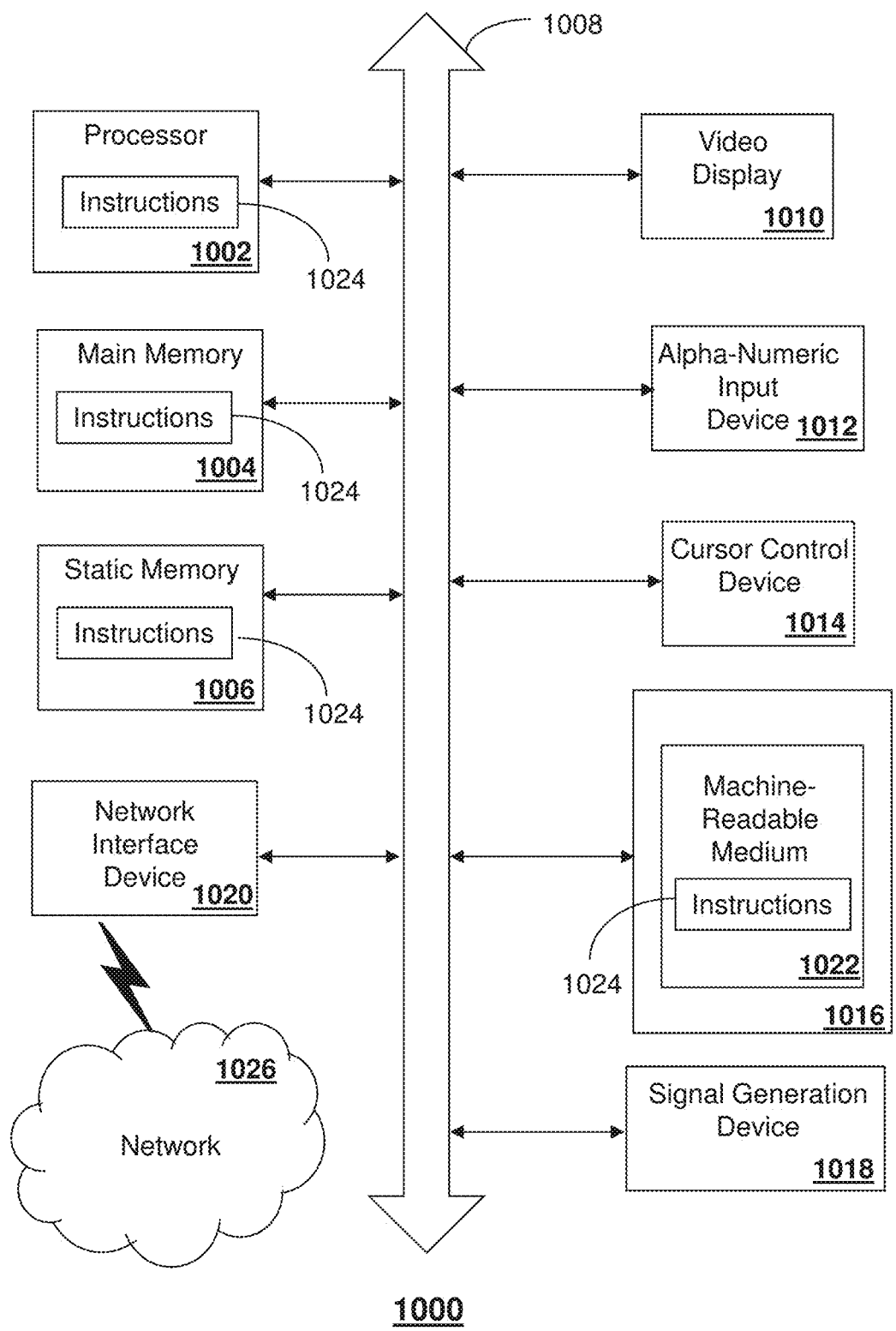
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the ad system 430, the media processor 706, the various systems and devices of the Sales, Billing, and Data Management System 102, the System and Data Integration Component 104, the Campaign Management & Analytics System 106, the Traffic Management System 108, and the Device Management System 110 of FIG. 1 and the various representations of FIGS. 2-6 and 11. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

creating, by a processing system comprising a processor, an advertising campaign according to an advertising objective, wherein the advertising objective includes desired traits for an audience of the advertising campaign;

obtaining, by the processing system, a plurality of messages related to the advertising campaign;

defining, by the processing system, a plurality of segments of a plurality of subscribers of an interactive media system according to the desired traits for the audience;

determining, by the processing system, media content from a plurality of media content distributed by the interactive media system that correlates with the plurality of segments as selected media content;

identifying, by the processing system, a subscriber from among the plurality of subscribers of the interactive media system that correlates with the plurality of segments according to subscriber information for the subscriber from a subscriber database;

identifying, by the processing system, a plurality of devices of the subscriber that receives portions of the plurality of media content from the interactive media system as an identified plurality of devices;

comparing, by the processing system, the subscriber information of the subscriber with the plurality of messages to generate an advertising playlist of the plurality of messages for the subscriber based on the identified plurality of devices;

analyzing, by the processing system, break metadata for the selected media content, wherein the break metadata defines time slots available for an insertion of messages within the selected media content;

monitoring, by the processing system, a consumption of the selected media content by the subscriber across the identified plurality of devices for an upcoming break segment in the selected media content;

selecting, by the processing system, a selected device of the identified plurality of devices of the subscriber for delivery of messages during the upcoming break segment;

selecting, by the processing system, a first set of messages from the plurality of messages of the advertising playlist to be assigned to the upcoming break segment based on matching the break metadata to a signature of each message of the plurality of messages of the advertising playlist, wherein the first set of messages is selected to be inserted into the upcoming break segment responsive to determining that the consumption of the selected media content by the subscriber is via the selected device, wherein the selecting the first set of messages comprises avoiding selection of a message of the plurality of messages of the advertising playlist that is not supported by the selected device, and wherein the signature of each message of the plurality of messages of the advertising playlist defines a length of time and a message content, and wherein selection of any messages from the plurality of messages of the advertising playlist is avoided for other devices of the identified plurality of devices of the subscriber based on a frequency constraint of the advertising campaign being satisfied;

delivering, by the processing system, the first set of messages to the selected device in proximity to the upcoming break segment to be inserted into the selected media content during the upcoming break segment;

monitoring, by the processing system, a consumption of the first set of messages by the selected device during the upcoming break segment;

reporting, by the processing system, the consumption of the first set of messages during the upcoming break segment to a message performance monitoring system for the advertising campaign;

analyzing, by the processing system, the consumption of the first set of messages for an efficacy of each message in the first set of messages; and providing, by the processing system, feedback concerning the efficacy of each message in the first set of messages to refine the selecting of the first set of messages from the plurality of messages of the advertising playlist.

2. The method of claim 1, further comprising providing an interface for receiving input to create the advertising campaign, wherein the creating the advertising campaign according to the advertising objective comprises defining the advertising objective across a set of campaign management systems, wherein the set of campaign management systems includes a digital campaign management system, an Over-The-Top (OTT) campaign management system, and a television (TV) campaign management system, wherein each campaign management system of the set of campaign management systems interfaces with an ad decision management entity of a plurality of ad decision management entities, wherein each ad decision management entity of the plurality of ad decision management entities interacts with a respective device of the identified plurality of devices of the subscriber, wherein the selecting the first set of messages and the delivering the first set of messages are facilitated through a first ad decision management entity of the plurality of ad decision management entities that interacts with the selected device of the identified plurality of devices of the subscriber and a first campaign management system of the set of campaign management systems that interfaces with the first ad decision management entity, wherein selecting additional sets of messages for other devices of the identified plurality of devices of the subscriber and delivering of the additional sets of messages to the other devices are facilitated through other ad decision management entities of the plurality of ad decision management entities and other campaign management systems of the set of campaign management systems, and wherein the set of campaign management systems and the plurality of ad decision management entities form a part of a cross platform campaign management system that enables addressable ad insertion across multiple platform types and corresponding subscriber device types.

3. The method of claim 1, further comprising:
determining a billing amount based upon the consumption of the first set of messages; and
generating a billing report based upon the billing amount for the advertising campaign.

4. The method of claim 1, further comprising:
determining a points of interest element to the advertising campaign, wherein the points of interest element defines location-based messaging for the advertising campaign;

determining a location of the plurality of devices; and
adjusting the selecting of the first set of messages according to the location of the plurality of devices and according to the points of interest element.

5. The method of claim 1, wherein the identifying the subscriber comprises accessing the subscriber database, wherein the monitoring of the consumption of the selected media content by the subscriber comprises monitoring for the upcoming break segment in the selected media content during the consumption of the selected media content by the subscriber, wherein the selecting the selected device is based on determining, according to the monitoring of the consumption of the selected media content by the subscriber, that the consumption of the selected media content by the subscriber is via the selected device, and wherein the selecting the first set of messages further comprises selecting only messages of the plurality of messages of the advertising playlist that are supported by the selected device.

6. The method of claim 1, further comprising grading the first set of messages based upon the reporting.

7. The method of claim 1, wherein the efficacy of each message in the first set of messages is determined by using the selected device to seek additional input or information provided by the first set of messages, or by using the selected device to ignore the first set of messages.

8. A device, comprising:
a processing system including a processor; and
a memory that stores executable instructions that, when executed by the processing system, facilitate performance of operations, comprising:

obtaining a plurality of messages related to an advertising objective of an advertising campaign, wherein the advertising objective includes desired traits for a plurality of segments of a plurality of subscribers of an interactive media system;

determining media content from a plurality of media content distributed by the interactive media system that correlates with the plurality of segments as selected media content;

identifying a subscriber from among the plurality of subscribers of the interactive media system that correlates with the plurality of segments according to subscriber information for the subscriber from a subscriber database;

identifying a plurality of devices of the subscriber that receives portions of the plurality of media content from the interactive media system as an identified plurality of devices;

analyzing break metadata for the selected media content, wherein the break metadata defines time slots available for an insertion of messages within the selected media content;

monitoring for a consumption of the selected media content by the subscriber across the identified plurality of devices for an upcoming break segment in the selected media content;

selecting a selected device of the identified plurality of devices of the subscriber for delivery of messages during the upcoming break segment;

selecting a first set of messages from the plurality of messages to be assigned to the upcoming break segment based on matching the break metadata to a signature of each message of the plurality of messages, wherein the first set of messages is selected to be inserted into the upcoming break segment responsive to determining that the consumption of the selected media content by the subscriber is via the selected device, wherein the selecting the first set of messages comprises avoiding selection of a message of the plurality of messages that is not supported by the selected device, wherein the signature of each message of the plurality of messages defines a length of time and a message content, and wherein selection of any messages from the plurality of messages is avoided for other devices of the identified plurality of devices of the subscriber based on a frequency constraint of the advertising campaign being satisfied;

delivering the first set of messages to the selected device in proximity to the upcoming break segment to be inserted into the selected media content during the upcoming break segment;

analyzing a consumption of the first set of messages for efficacy of each message in the first set of messages, wherein the efficacy is determined by using the selected device to seek additional input or information provided by the first set of messages, or by using the selected device to ignore the first set of messages; and providing feedback concerning the efficacy of each message in the first set of messages to refine the selecting of the first set of messages from the plurality of messages.

9. The device of claim 8, wherein the operations further comprise generating an advertising playlist of the messages for the subscriber based on the identified plurality of devices and the subscriber information, wherein the selected message is selected from the advertising playlist.

10. The device of claim 8, wherein the operations further comprise:
monitoring a consumption of the first set of messages by the selected device during the upcoming break segment; and
reporting the consumption of the first set of messages during the upcoming break segment to a message performance monitoring system for the advertising campaign.

11. The device of claim 10, wherein the operations further comprise:
determining a billing amount based upon the consumption of the first set of messages; and
generating a billing report based upon the billing amount for the advertising campaign.

12. The device of claim 8, wherein the operations further comprise:
determining a points of interest element to the advertising campaign, wherein the points of interest element defines location-based messaging for the advertising campaign;
determining a location of the plurality of devices; and
adjusting the selecting of the first set of messages according to the location of the plurality of devices and according to the points of interest element.

13. The device of claim 8, wherein the advertising objective is defined across a set of campaign management systems, wherein the set of campaign management systems includes a digital campaign management system, an Over-The-Top (OTT) campaign management system, and a television (TV) campaign management system, wherein each campaign management system of the set of campaign management systems interfaces with an ad decision management entity of a plurality of ad decision management entities, wherein each ad decision management entity of the plurality of ad decision management entities interacts with a respective device of the identified plurality of devices of the subscriber, wherein the selecting the first set of messages and the delivering the first set of messages are facilitated through a first ad decision management entity of the plurality of ad decision management entities that interacts with the selected device of the identified plurality of devices of the subscriber and a first campaign management system of the set of campaign management systems that interfaces with the first ad decision management entity, wherein selecting additional sets of messages for other devices of the identified plurality of devices of the subscriber and delivering of the additional sets of messages to the other devices are facilitated through other ad decision management entities of the plurality of ad decision management entities and other campaign management systems of the set of campaign management systems, and wherein the set of campaign management systems and the plurality of ad decision management entities form a part of a cross platform campaign management system that enables addressable ad insertion across multiple platform types and corresponding subscriber device types.

14. A non-transitory machine-readable storage medium, comprising executable instructions that, when executed by a processing system including a processor, facilitate performance of operations, comprising:
analyzing a plurality of segments of a plurality of subscribers of an interactive media system according to desired traits to determine identified subscribers to target for an advertising campaign, wherein an interface is provided to a client device to submit the advertising campaign, wherein the advertising campaign includes the desired traits for an audience of the advertising campaign and advertising content for the advertising campaign;
identifying a plurality of devices for a selected subscriber of the identified subscribers that receive portions of selected media content from the interactive media system as an identified plurality of devices, wherein the selected media content includes content distributed by the interactive media system that correlates with the audience;
generating an advertising playlist of the advertising content for the selected subscriber based on the identified plurality of devices by comparing subscriber information of the selected subscriber with the advertising content;
monitoring for a consumption of the selected media content by the selected subscriber across the identified plurality of devices for an upcoming break segment in the selected media content according to break metadata, wherein the break metadata defines time slots available for an insertion of messages within the selected media content;
selecting a selected device of the identified plurality of devices of the selected subscriber for delivery of messages during the upcoming break segment;
selecting a message from the advertising playlist to be assigned to the upcoming break segment based on matching the break metadata to the advertising content as a selected message wherein the selected message is selected to be inserted into the upcoming break segment responsive to determining that the consumption of the selected media content by the selected subscriber is via the selected device, and wherein the selecting the message comprises avoiding selection of any message from the advertising playlist that is not supported by the selected device, and wherein selection of any messages from the advertising playlist is avoided for other devices of the identified plurality of devices of the selected subscriber based on a frequency constraint of the advertising campaign being satisfied;

transmitting the selected message to the selected device;

instructing the selected device to insert the selected message into the selected media content during the upcoming break segment;

analyzing a consumption of the selected message for efficacy, wherein the efficacy is determined by using the selected device to seek additional input or information provided by the selected messages, or by using the selected device to ignore the selected messages; and providing feedback concerning the efficacy of the selected message to refine the selecting of a message from the advertising playlist.

15. The non-transitory machine-readable storage medium of claim 14, wherein the operations further comprise:

monitoring a consumption of the selected message by the selected device during the upcoming break segment; and reporting the consumption of the selected message during the upcoming break segment to a message performance monitoring system for the advertising campaign.

16. The non-transitory machine-readable storage medium of claim 15, wherein the operations further comprise:

determining a billing amount based upon the consumption of the selected message; and generating a billing report based upon the billing amount for the advertising campaign.

17. The non-transitory machine-readable storage medium of claim 15, wherein the operations further comprise:

grading the selected messages based upon the reporting to generate a grade reports for the selected messages; and modifying the generating of the advertising playlist responsive to the grading of the selected messages.

18. The non-transitory machine-readable storage medium of claim 17, wherein the operations further comprise transmitting the grade reports to the client device.

19. The non-transitory machine-readable storage medium of claim 14, wherein the advertising campaign is defined across a set of campaign management systems, wherein the set of campaign management systems includes a digital campaign management system, an Over-The-Top (OTT) campaign management system, and a television (TV) campaign management system, wherein each campaign management system of the set of campaign management systems interfaces with an ad decision management entity of a plurality of ad decision management entities, wherein each ad decision management entity of the plurality of ad decision management entities interacts with a respective device of the identified plurality of devices of the selected subscriber, wherein the selecting the message from the advertising playlist and the transmitting of the selected message are facilitated through a first ad decision management entity of the plurality of ad decision management entities that interacts with the selected device of the identified plurality of devices of the selected subscriber and a first campaign management system of the set of campaign management systems that interfaces with the first ad decision management entity, wherein selecting additional messages from the advertising playlist for other devices of the identified plurality of devices of the selected subscriber and delivering of the additional messages to the other devices are facilitated through other ad decision management entities of the plurality of ad decision management entities and other campaign management systems of the set of campaign management systems, and wherein the set of campaign management systems and the plurality of ad decision management entities form a part of a cross platform campaign management system that enables addressable ad insertion across multiple platform types and corresponding subscriber device types.

20. The non-transitory machine-readable storage medium of claim 14, wherein the operations further comprise:

obtaining a location element for the advertising campaign from the client device, wherein the location element defines location-based messaging for the advertising campaign;

determining a location of the plurality of devices; and adjusting the selecting of the messages according to the location of the plurality of devices and according to the location element.

* * * * *

UNITED STATES PATENT AND TRADEMARK OFFICE
CERTIFICATE OF CORRECTION

PATENT NO. : 11,051,056 B2
APPLICATION NO. : 15/830111
DATED : June 29, 2021
INVENTOR(S) : Scott G. Crawford et al.

Page 1 of 1

It is certified that error appears in the above-identified patent and that said Letters Patent is hereby corrected as shown below:

In the Claims

In Claim 14, Column 24, Line 58, please delete "as a selected message wherein the selected message is" and insert -- as a selected message, wherein the selected message is --

In Claim 14, Column 25, Lines 10 and 11, please delete "provided by the selected messages, or by using the selected device to ignore the selected messages; and" and insert -- provided by the selected message, or by using the selected device to ignore the selected message; and --

In Claim 17, Column 25, Lines 31 through 34, please delete "grading the selected messages based upon the reporting to generate a grade reports for the selected messages; and modifying the generating of the advertising playlist responsive to the grading of the selected messages." and insert -- grading the selected message based upon the reporting to generate a grade report for the selected message; and modifying the generating of the advertising playlist responsive to the grading of the selected message. --

In Claim 18, Column 25, Line 37, please delete "mitting the grade reports to the client device." and insert -- mitting the grade report to the client device. --

In Claim 20, Column 26, Line 37, please delete "adjusting the selecting of the messages according to the" and insert -- adjusting the selecting of the message according to the --

Signed and Sealed this
Third Day of August, 2021

Drew Hirshfeld
*Performing the Functions and Duties of the
Under Secretary of Commerce for Intellectual Property and
Director of the United States Patent and Trademark Office*